(12) United States Patent
Park et al.

(10) Patent No.: US 9,254,741 B2
(45) Date of Patent: Feb. 9, 2016

(54) IN-WHEEL ACTUATOR AND IN-WHEEL ASSEMBLY COMPRISING THE SAME

(71) Applicant: SAMSUNG ELECTRONICS CO., LTD., Suwon-si (KR)

(72) Inventors: Sung-Hyuk Park, Yongin-si (KR); Seong-Taek Lim, Suwon-si (KR); Jin-woo Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 13/782,674

(22) Filed: Mar. 1, 2013

(65) Prior Publication Data
US 2014/0042796 A1 Feb. 13, 2014

(30) Foreign Application Priority Data

Aug. 7, 2012 (KR) ......................... 10-2012-0086371

(51) Int. Cl.
*B60K 7/00* (2006.01)
*B60K 17/04* (2006.01)
*B60K 6/365* (2007.10)
*F16H 1/32* (2006.01)

(52) U.S. Cl.
CPC ............. *B60K 7/0007* (2013.01); *B60K 17/046* (2013.01); *B60K 6/365* (2013.01); *B60K 2007/0038* (2013.01); *B60K 2007/0092* (2013.01); *F16H 1/32* (2013.01)

(58) Field of Classification Search
CPC ....................................................... B60K 7/0007
USPC ........................................................... 475/149
See application file for complete search history.

(56) References Cited

U.S. PATENT DOCUMENTS

| | | | | |
|---|---|---|---|---|
| 5,163,528 | A | * | 11/1992 | Kawamoto et al. ........ 180/65.51 |
| 7,556,580 | B2 | * | 7/2009 | Saito et al. ..................... 475/154 |
| 7,621,835 | B2 | * | 11/2009 | Oshidari ........................... 475/5 |
| 2008/0202832 | A1 | * | 8/2008 | Ai ................................. 180/65.5 |
| 2011/0024206 | A1 | * | 2/2011 | Sagara et al. ................ 180/65.1 |
| 2011/0115320 | A1 | * | 5/2011 | Palfai et al. ..................... 310/83 |

FOREIGN PATENT DOCUMENTS

| | | |
|---|---|---|
| JP | 09-132040 A | 5/1997 |
| JP | 2003-028254 A | 1/2003 |
| JP | 2005-218245 A | 8/2005 |
| KR | 20-0426385 Y1 | 9/2006 |

\* cited by examiner

*Primary Examiner* — Derek D Knight
*Assistant Examiner* — David Morris
(74) *Attorney, Agent, or Firm* — Sughrue Mion, PLLC (57) ABSTRACT

An in-wheel assembly includes an in-wheel actuator and a wheel. The in-wheel actuator includes a driving motor, a decelerator which is disposed in the driving motor and configured to decrease a rotational speed received from the driving motor, and an output shaft which is configured to receive the rotational speed decreased by the decelerator. The wheel is configured to accommodate the in-wheel actuator in an inner space and is driven by the rotational speed of the output shaft to rotate.

8 Claims, 6 Drawing Sheets

IN-WHEEL ACTUATOR AND IN-WHEEL ASSEMBLY COMPRISING THE SAME

CROSS-REFERENCE TO RELATED APPLICATION(S)

This application claims priority from Korean Patent Application No. 10-2012-0086371, filed on Aug. 7, 2012, in the Korean Intellectual Property Office, the entire disclosure of which is incorporated herein by reference.

BACKGROUND

1. Field

The following description relates to an in-wheel actuator applicable to a vehicle, such as an electric automobile, which is driven with electrical power, and an in-wheel assembly comprising the same.

2. Description of the Related Art

Hybrid vehicles and electric vehicles have gained more popularity due to harmful environmental effects from air pollution and a shortage of fossil fuels. A hybrid vehicle uses an internal-combustion engine to generate power, and uses an electric motor as an auxiliary power source. An electric vehicle uses an electric motor as a main power source.

With the development of technologies for batteries and motors, it is expected that electric vehicles, known as pollution-free cars, will replace "transition" vehicles, such as hybrid cars, since electric vehicles emit no pollutants or carbon dioxide during driving.

An in-wheel system has a driving motor mounted on a wheel, and delivers power from the driving motor directly to the wheel. The application of the in-wheel system allows a vehicle to have a compact and organized driving system, thereby reducing vehicle weight and improving a degree of freedom in vehicle layout or design. In addition, the in-wheel system contributes to optimization of a vehicle frame to increase collision safety. Further, the in-wheel system increases a drive motor performance of the vehicle and facilitates a larger interior space by optimally balancing weight across the vehicle.

In addition, the size of a driving motor is proportional to a level of output torque. Therefore, the bigger the size of the driving motor is, the higher the output torque can be achieved. However, an in-wheel assembly of an in-wheel system needs to be designed such that a driving motor embedded in a wheel should not protrude outward to prevent the driving motor from any external force. In addition, a brake is embedded in the wheel of the in-wheel assembly and the driving motor is arranged in the wheel, separately from the brake. Therefore, there is a limit to increasing the size of the driving motor.

In order to achieve output torque high enough to drive a vehicle, a decelerator can be installed to an output shaft of a driving motor. In this case, the size of the driving motor may be reduced. However, a decelerator is usually arranged outside of the driving motor in series. Thus, the size of the in-wheel assembly, including the driving motor, is not reduced as much as expected.

SUMMARY

According to an aspect of an embodiment, there is provided an in-wheel actuator including a driving motor; a decelerator which is integrated inside the driving motor and configured to decrease a rotational speed input from the driving motor; and an output shaft which is configured to receive the rotational speed decreased by the decelerator.

According to an aspect of another embodiment, there is provided an in-wheel assembly including an in-wheel actuator including a driving motor, a decelerator which is integrated into the driving motor and configured to decrease a rotational speed received from the driving motor, and an output shaft which is configured to receive the rotational speed decreased by the decelerator; and a wheel which is configured to accommodate the in-wheel actuator and receives a rotational speed of the output shaft to rotate.

According to an aspect of another embodiment, there is provided a decelerator of an in-well actuator including a ring gear which is connected to an inner wall of a rotor and receives a rotation of the rotor to rotate; a sun gear which is connected to a motor housing and spaced apart from a circumference of an output shaft; a plurality of planet gears which are arranged on a circumference of the sun gear and configured between the ring gear and the sun gear; and a carrier, which is coupled to the output shaft.

Other features and aspects may be apparent from the following detailed description, the drawings, and the claims.

BRIEF DESCRIPTION OF THE DRAWINGS

The above and/or other aspects will become more apparent and readily appreciated from the following description of exemplary embodiments, taken in conjunction with the accompanying drawings, in which.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Figure 1:
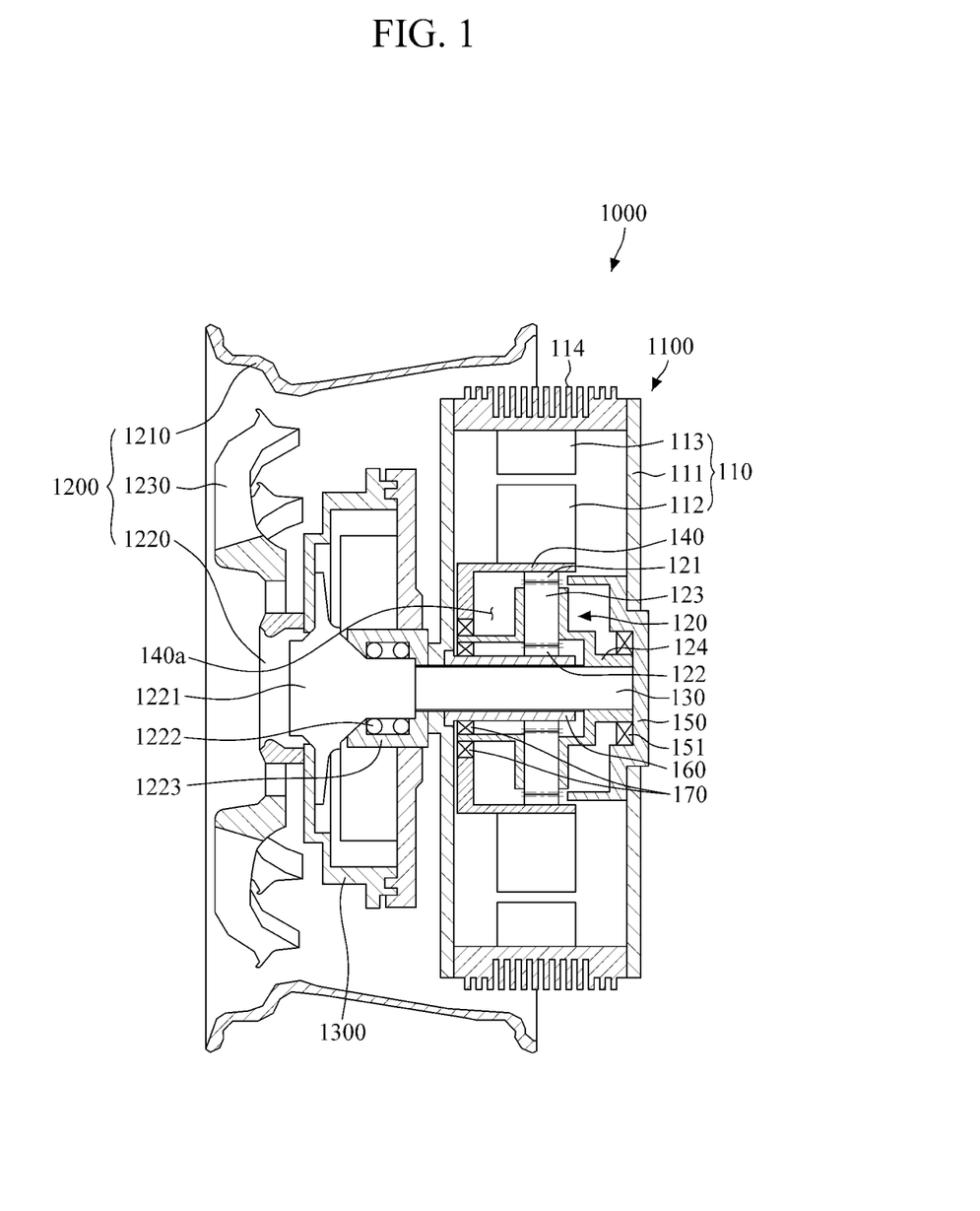
FIG. 1 is a cross sectional view illustrating an in-wheel assembly according to an exemplary embodiment.

FIG. 1 is a cross sectional view illustrating an in-wheel assembly according to an exemplary embodiment.

Referring to FIG. 1, the in-wheel assembly 1000 includes in an in-wheel actuator 1100 and a wheel 1200.

The in-wheel actuator 1100 includes a driving motor 110, a decelerator 120, and an output shaft 130. The driving motor 110 may generate rotation power to rotate the wheel 1200.

The decelerator 120 decreases a rotational speed of the driving motor 110 and outputs the decreased rotational speed to the output shaft 130. In other words, the decelerator 140 may convert high-speed and low-torque driving of the driving motor 110 to low-speed and high-torque driving of the output shaft 130. The decelerator 120 is integrated into the driving motor 110. The output shaft 130 receives the rotational speed which is decreased by the decelerator 120.

The wheel 1200 accommodates the in-wheel actuator 1100, and is driven by the rotational speed of the output shaft 130 to rotate. The wheel 1200 may be configured such that a tire (not shown) can be mounted on the circumference of the wheel 1200. The tire may rotate with the rotational movement of the wheel 1200.

As discussed above, the decelerator 120 is disposed inside of the driving motor 110 so that the in-wheel actuator 1100 may have a simpler configuration and become compact, as compared to when the decelerator 120 is arranged on the outside of the driving motor 110 in series. In particular, the in-wheel actuator 1100 may have a shorter thickness along a direction of a rotation axis, while being able to generate output torque high enough to drive a vehicle due to the decelerator 120. Thus, the in-wheel actuator 110 is mounted on the inside of the wheel 1200 without protruding outward. Therefore, the in-wheel actuator 1100 may avoid an external force.

The wheel 1200 may include a rim 1210, a hub 1220, and a plurality of spokes 1230. The rim 1210 is ring-shaped to enclose the circumference of the in-wheel actuator 1100. In addition, an outer circumference of the rim 1210 is formed in a shape to allow the tire to be mounted thereon. The hub 1220 is placed in the center of the rim 1210. The hub 1220 includes a hub shaft 1221 connected to the output shaft 130.

The hub shaft 1221 may rotate, supported by a hub bearing 1222. For example, a hub support 1223 into which the hub shaft 1221 is inserted, may be connected to a motor housing 111 of the driving motor 110, and the hub bearing 1222 may be mounted to the hub support 1223 to support rotation of the hub shaft 1221. Between the rim 1210 and the hub 1220, a plurality of spokes 1230 are arranged on the circumference of the hub 1220. The spokes 1230 have one end connected to the rim 1210 and the other end connected to the hub 1220.

A drum break 1300 may be accommodated inside of the wheel 1200. The drum break 1300 may be coupled to the wheel 1200 at a closer distance, than the motor housing 111. The drum break 1300 may be fixed to the hub 1220 of the wheel 1200 to thereby be rotated with the wheel 1200. Various breaking devices, besides the drum break 1300, e.g., a disk break, may be provided inside the wheel 1200.

The driving motor 110 may include the motor housing 111, a rotor 112 and a stator 113. The motor housing 111 may be in a cylindrical shape having an inner space, and the rotor 112 and the stator 113 may be accommodated in the inner space of the motor housing 111. A plurality of radiation fins 114 may be arranged on the outer surface of the motor housing 111. A plurality of radiation fins helps to improve radiant heat performance of the motor housing 111 using air-cooling effects.

The rotor 112 is rotatably disposed in the middle of the motor housing 111. Specifically, a through-hole is formed at the center of the rotor 112 in a direction of a rotation axis. For example, the rotor 112 may have a cylindrical shape with a through-hole in the middle of the rotor 112. The stator 113 is spaced apart from the circumference of the rotor 112, and fixed onto the inner wall of the motor housing 111. For example, the stator 113 may have a hollow cylindrical shape and may be fixed onto the inner wall of the motor housing 111, and the rotor 112 is inserted into a hollow of the stator 113.

The rotor 112 may have a permanent magnet, and the stator 113 may have a stator coil. In response to current being provided to the stator coil while a magnetic field is generated by the permanent magnet, the rotor 112 rotates by electromagnetic power to thereby generate rotation power. In addition, the driving motor 110 may be an outer driving motor that has a rotor rotatably coupled around the circumference of a stator to thereby be provided with power.

A hollow shaft 140 may transfer a rotation power of the rotor 112 to the decelerator 120. Specifically, as the hollow shaft 140 is fixed onto the inner wall of the rotor 112 to thereby be rotated with the rotor 112, the rotation power of the hollow shaft 140 may be transferred to the decelerator 120. In addition, the hollow shaft 140 includes a hollow 140a into which the decelerator 120 is inserted. Specifically, the decelerator 120 may be enclosed and protected by the hollow shaft 140 and a cover 150. The hollow shaft 140 disposed inside of the motor housing 111 may be arranged closer to the wheel 1200, than the cover 150.

A protruding portion of the cover 150, far from the wheel 1200, may be coupled to the motor housing 111. The cover 150 may have an inner space and an open end that is toward the hollow shaft 140. A portion of the decelerator 120 is included in the inner space of the cover 150. The open end of the cover 150 may be aligned in parallel to an open end of the hollow shaft 140. The gap between the open ends of the cover 150 and the hollow shaft 140 may be sealed.

A bearing 151, mounted on the inside of the cover 150, may enable the cover 150 to support rotation of the output shaft 130. Since the decelerator 120 is enclosed and protected by the hollow shaft 140 and the cover 150, other configurations, such as an outer housing, which are necessary to protect internal elements of the decelerator 120 may be omitted. Therefore, the internal structure of the in-wheel actuator 1100 may be simple.

The decelerator 120 may reduce a rotation power input from the rotor 112 by one step, and transmit the reduced rotational speed to the output shaft 130.

Figure 2:
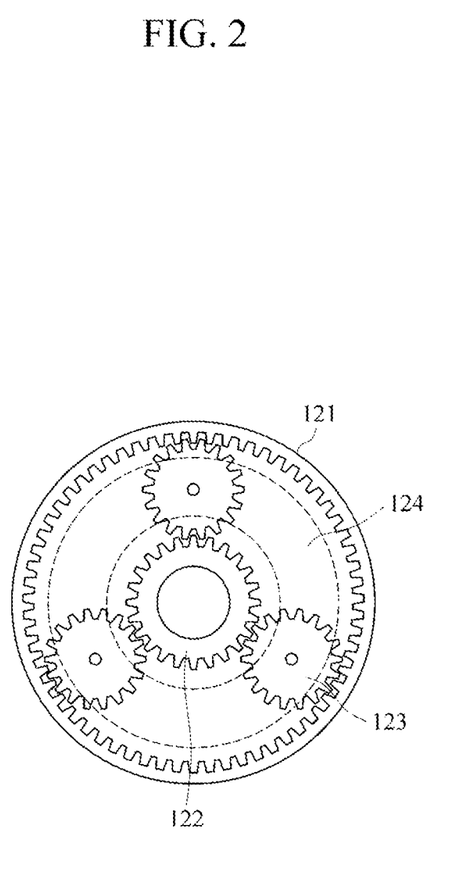
FIG. 2 is a diagram illustrating a decelerator of FIG. 1 according to an exemplary embodiment.

Referring to FIGS. 1 to 2, the decelerator 120 may include a ring gear 121, a sun gear 122, a plurality of planet gears 123, and a carrier 124.

The ring gear 121 is connected to the inner wall of the rotor 112 and receives the rotation power of the rotor 112 to thereby rotate. The ring gear 121 may be fixed onto the inner wall of the hollow shaft 140 to thereby be connected to the rotor 112. The sun gear 122 is spaced apart from the circumference of the output shaft 130. The sun gear 122 is arranged to face the ring gear 121, while being connected to the motor housing 111. The sun gear 122 is fixed to the motor housing 111, so that the sun gear 122 does not rotate with the ring gear 121.

The sun gear 122 may be arranged on the circumferential surface of a sun gear support 160, which has a hollow cylinder shape. The output shaft 130 may be inserted into a hollow space of the sun gear support 160. The sun gear support 160 may be placed in the motor housing 111. One end of the sun gear support 160 may be fixed to the motor housing 111.

Between the ring gear 121 and the sun gear 122, the planet gears 123 are arranged on the circumference of the sun gear 122. One side of each of the planet gears 123 is engaged to the ring gear 121, and the other side of the planet gears 123 is engaged to the sun gear 122. Between the ring gear 121 and the sun gear 122, the planet gears 123 orbit and revolve in response to rotation of the ring gear 121.

The carrier 124 is coupled to the output shaft 130. In addition, the carrier 124 is coupled to the planet gears 123, to thereby rotate on the same rotational axis as that of the output shaft 130, in response to revolution of the planet gears 123. At this time, each of the planet gears 123 is orbitally coupled to the carrier 124. The carrier 124 transfers to the output shaft 130 a rotational power exerted by the revolution of the planet gears 123.

An operation of the decelerator 120 will now be described. If the ring gear 121 is driven by the rotor 112 to rotate, a rotational speed of the carrier 124 is slower than that of the rotor 112. At this time, the decelerator 120 decreases the rotational speed of the rotor 112, and transfers the decreased rotational speed to the output shaft 130. The bearing 170 is able to support, between the carrier 124 and the hollow shaft 140, and between the carrier 124 and the sun gear support 160.

Figure 3:
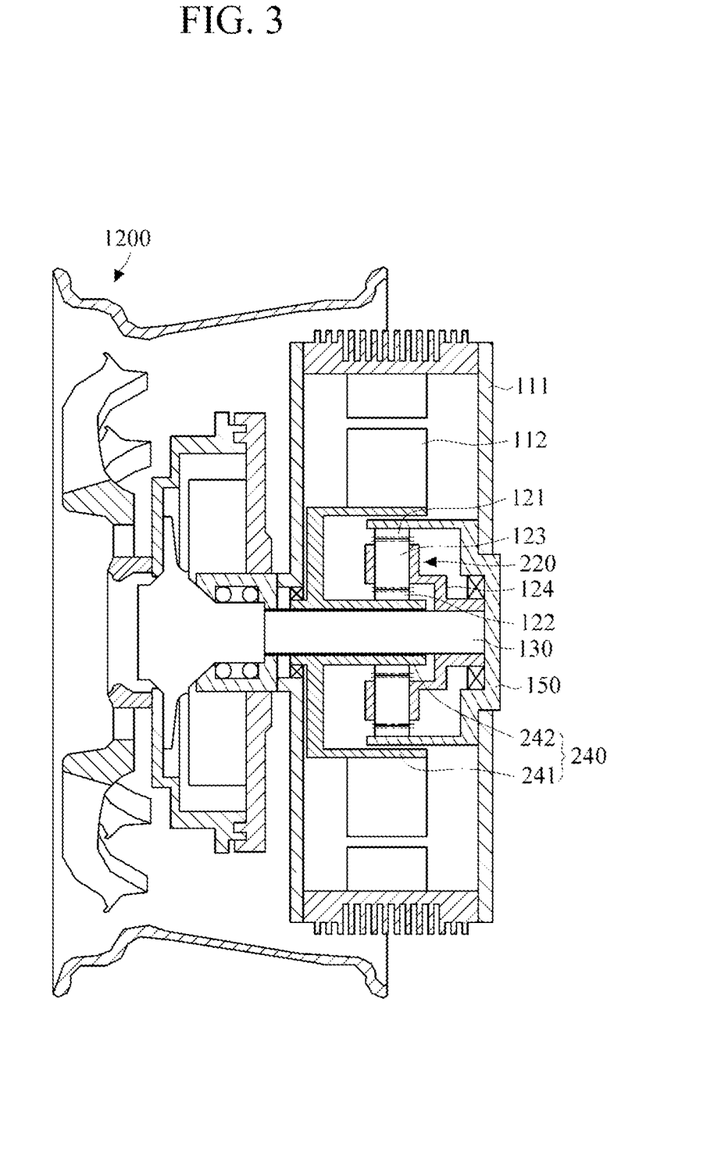
FIG. 3 is a cross sectional view illustrating an in-wheel assembly including a first decelerator according to another exemplary embodiment.

As another example, a decelerator 220 illustrated in FIG. 3 may have a reduction ratio, higher than that of the decelerator 120 shown in FIG. 1. A sun gear 122 of the decelerator 220 is connected to the rotor 112. Thus, the rotational speed of the rotor 112 is transferred to the sun gear 122. The sun gear 122 may be arranged in the hollow shaft 240 to be connected to the rotor 112.

A hollow shaft 240 may include a shaft body 241 and a sun gear support 242, connected to a rotation center of a shaft body 241. The shaft body 241 has a hollow space, and is fixed onto the inner wall of the rotor 112. The sun gear support 242 may have a hollow cylinder shape. The output shaft 130 is inserted into a hollow space of the sun gear support 242. The sun gear 122 may be arranged on the circumference of the sun gear support 242. The ring gear 121 is connected to a motor housing 111. The ring gear 121 may be arranged on the inner wall of the cover 150 to thereby be connected to the motor housing 111.

If the sun gear 122 is driven by the rotation power of the rotor 112 to rotate, the planet gears 123 orbit and revolve between the ring gear 121 and the sun gear 122. The carrier 124 transfers to the output shaft 130 the rotation power exerted by revolution of the planet gears 123. If a rotation power of the rotor 112 with the same rotation speed is first input into the sun gear 122 or the ring gear 121, the rotation speed output to the output shaft 130 may be reduced more in the case when the rotation power is first input into the sun gear 122, compared to the case when the rotation power is first input into the ring gear 121. In other words, the decelerator 220 illustrated in FIG. 3 may have a reduction ratio higher than that of the decelerator 120 shown in FIG. 1. Thus, the decelerator 220 may drive the wheel 1200 with higher torque, compared to the decelerator 120.

Figure 4:
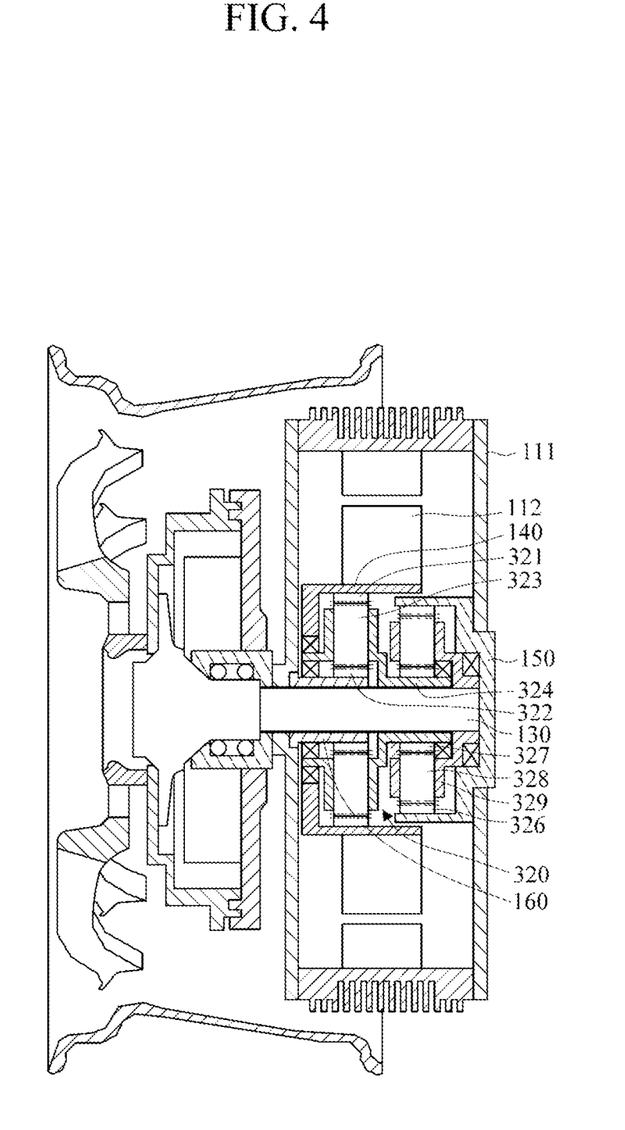
FIG. 4 is a cross sectional view illustrating an in-wheel assembly including a second decelerator according to an exemplary embodiment.

As shown in FIG. 4, a decelerator 320 may reduce a rotation power of the rotor 112 by two steps, and transfer the reduced rotation power to the output shaft 130. In this case, the decelerator 320 may have a much higher reduction ratio. Thus, the output shaft 130 may also output a much higher torque.

The decelerator 320 includes a first ring 321, a second ring 326, a first sun gear 322, a second gear 327, a plurality of first planet gears 323, a plurality of second planet gears 328, a plurality of first carriers 324, and a plurality of second carriers 329. The first ring gear 321 is fixed on the inner wall of the rotor 112, and receives a rotation power of the rotor 112 to rotate. The first ring gear 321 may be fixed onto the inner wall of the hollow shaft 140, to thereby be connected to the rotor 112.

The first sun gear 322 is spaced apart from the circumference of an output shaft 130 and connected to a motor housing 111. The first sun gear 322 is fixed to the motor housing 111, and does not rotate with the first ring gear 321. The first sun gear 322 may be arranged on the circumferential surface of the sun gear support 160.

Between the first ring gear 321 and the first sun gear 322, the first planet gears 323 are arranged on the circumference of the first sun gear 322. The first planet gears 323 have one end engaged to the first ring gear 321 and the other end engaged to the first sun gear 322. In response to rotation of the first ring gear 321, the first planet gears 323 orbit and revolve between the first ring gear 321 and the first sun gear 322. The first carrier 324 is connected to the first planet gears 323, so that the first carrier 324 is driven by revolution of the first planet gears 323 to rotate. The first carrier 324 transfers to the second sun gear 327 a rotational speed, exerted by the revolution of the first planet gears 323.

The second sun gear 327 is arranged on the circumference of the first carrier 324. The second ring gear 326 is spaced apart from the circumference of the second sun gear 327. The second ring gear 326 is connected to the motor housing 111. The second ring gear 326 may be fixed onto the inner wall of a cover 150 to be connected to the motor housing 111.

Between the second ring gear 326 and the second sun gear 327, the second planet gears 328 are arranged on the circumference of the second sun gear 327. Each of the planet gears 328 have one end engaged to the second ring gear 326 and the other end engaged to the second sun gear 327.

The second carrier 329 is coupled to an output shaft 130. The second carrier 329 is coupled to the second planet gears 328 to rotate on the same rotational axis as that of the output shaft 130, in response to revolution of the second planet gears 328. The second carrier 329 transfers a rotational speed exerted by the revolution of the second planet gears 328.

An operation of the above-described decelerator 320 will now be described. Rotation power of the rotor 112 is transferred to the first ring gear 321, and then first reduced in the first planet gears 323 and the first carrier 324. The rotation power first reduced by one step is transferred to the second sun gear 327, and second reduced in the second planet gears 328 and the second carrier 329. The rotational speed second reduced by two steps is transferred to the output shaft 130. Thus, the output shaft 130 may output a higher torque.

Figure 5:
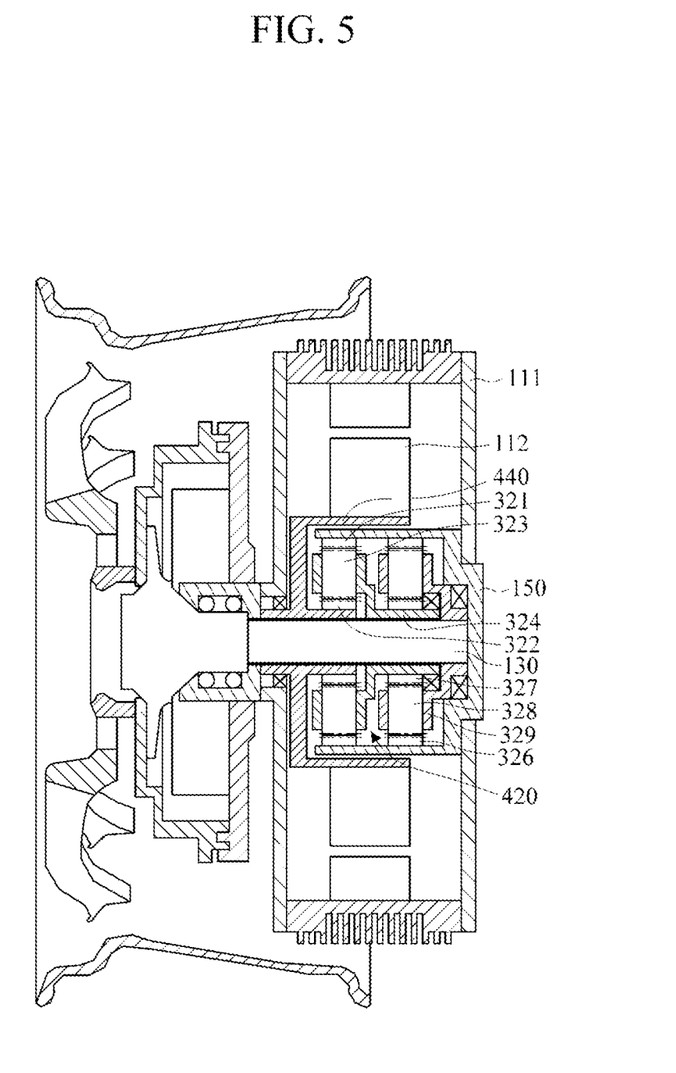
FIG. 5 is a cross sectional view illustrating an in-wheel assembly including a second decelerator according to another exemplary embodiment.

As another example, a decelerator 420 illustrated in FIG. 5 may have a reduction ratio higher than that of the decelerator 320 shown in FIG. 4. As a first sun gear 322 disposed in the decelerator 420 is connected to a rotor 112, a rotational speed of the rotor 112 is transferred to the first sun gear 322. The first sun gear 322 may be arranged in a hollow shaft 440 to thereby be connected to the rotor 112. The hollow shaft 440 may be configured in the same manner as that of the hollow shaft 240 shown in FIG. 3. A first ring gear 321 is connected to a motor housing 111. The first ring gear 321 may be fixed onto the inner wall of the cover 150 to be connected to the motor housing 111.

After being transferred to the first sun gear 322, the rotation power of the rotor 112 is first reduced in a first ring gear 321, first planet gears 323, and a first carrier 324. If the rotation power of the rotor 112 with the same rotational speed is first input into the first sun gear 322 or the first ring gear 321, the rotation speed output to the first carrier 324 may be reduced more in the case when the rotation power is first input into the first sun gear 322, compared to the case when the rotation power is first input into the ring gear 321.

Next, the first-reduced rotational speed of the rotor 112 is transferred to the second sun gear 327, and second reduced in the second planet gears 328 and the second carrier 329. Operations of the decelerator 420 to second reduce the first-reduced rotational speed may be the same as those of the decelerator 320. As a result, the decelerator 420 illustrated in FIG. 5 may have a reduction ratio higher than that of the decelerator 320 shown in FIG. 4. Thus, a wheel 1200, including the decelerator 420, is driven using a much higher torque.

Figure 6:
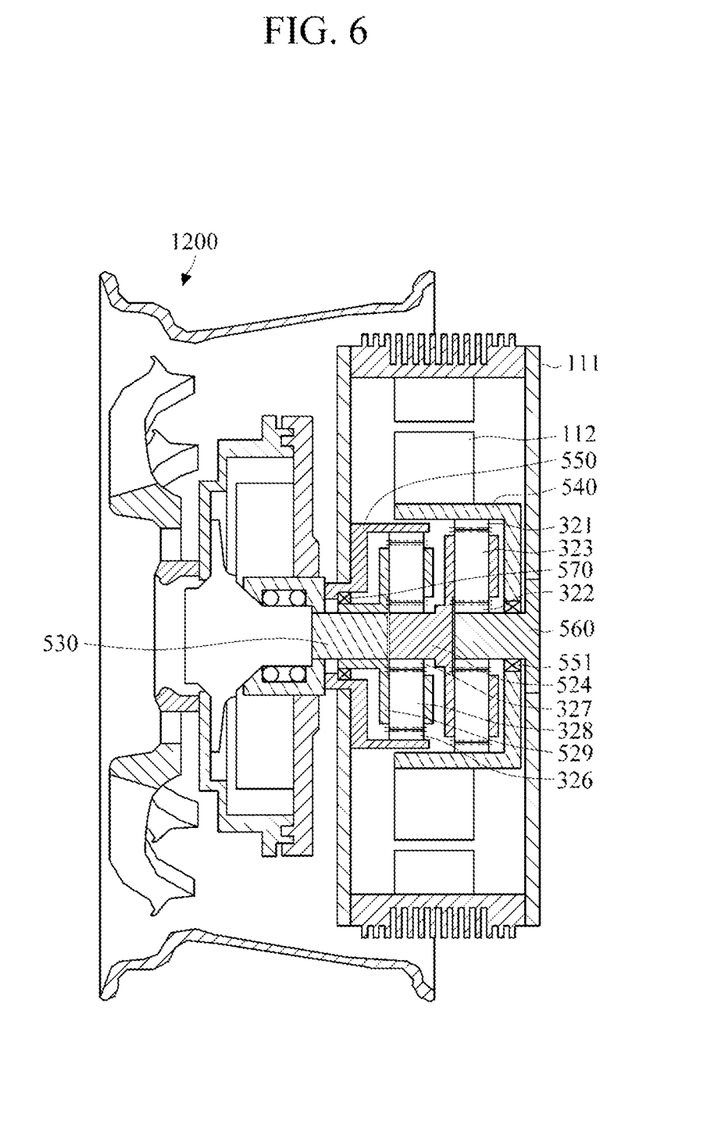
FIG. 6 is a cross sectional view illustrating an in-wheel assembly including an in-wheel actuator according to another exemplary embodiment.

FIG. 6 is a cross sectional view, illustrating an in-wheel assembly including an in-wheel actuator according to another exemplary embodiment. Referring to FIG. 6, a hollow shaft 540 is arranged further from a wheel 1200 than a cover 550. A protruding portion of the cover 550 toward the wheel 1200 may be coupled to a motor housing 111. The cover 550 is configured such that an output shaft 530 is capable of penetrating a protruding portion of the cover 550 toward the wheel 1200.

A first ring gear 321 is fixed onto the inner wall of the hollow shaft 540, to thereby be connected to a rotor 112. The first sun gear 322 is arranged on the circumference of a support shaft 560. Among both ends of the support shaft 560, one end far from the wheel 1200 is fixed to the motor housing 111, and the other end close to the wheel 1200 is inserted into the hollow shaft 540. The support shaft 560 may be a solid shaft. In addition, a bearing 551 may be mounted between the hollow shaft 540 and the support shaft 560, so as to support rotation of the hollow shaft 540.

Each of first planet gears 323 has one end engaged to a first ring gear 321 and the other end engaged to a first sun gear 322. A first carrier 524 is coupled to the first planet gears 323, to thereby be rotated with the first planet gears 323. The first carrier 524 transfers to the sun gear 327 the rotation speed exerted by the revolution of the first planet gears 323. The first carrier 524 may be configured to accommodate a solid shaft, which is extended toward the wheel 1200

The second sun gear 327 is arranged on the circumference of the first carrier 324. The second ring gear 326 is fixed onto the inner wall of the cover 550. Each of the second planet gears 328 has one end engaged to the second ring gear 326 and the other end engaged to the second sung gear 327. The second carrier 529 is coupled to the output shaft 530, so that a rotational speed of the second carrier 529 is transferred to the output shaft 530. A bearing 570 is mounted between the second carrier 529 and the cover 550, to thereby support rotation of the second carrier 529.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An in-wheel actuator comprising:
a driving motor which includes a motor housing, a rotor rotatably arranged inside the motor housing, and a stator spaced apart from an outer wall of the rotor and fixed onto an inner wall of the motor housing;
a hollow shaft which is arranged in the motor housing and accommodated by the rotor, and has a hollow with one open end and an outer wall fixed to an inner wall of the rotor so that the hollow shaft rotates by a rotational power of the rotor;
a decelerator which is inserted into the hollow of the hollow shaft and is configured to decrease a rotational speed of the hollow shaft;
a cover which is coupled to the motor housing, and has an inner space and an open end that is toward the hollow shaft and is aligned in parallel to the open end of the hollow shaft in a manner that the open end of the cover and the open end of the hollow shaft overlap each other, and thereby accommodates the decelerator as well as the hollow shaft; and
an output shaft which is configured to receive the rotational speed decreased by the decelerator,
wherein the decelerator is configured to reduce the rotational speed received from the rotor by at least one step, and output a rotational speed reduced by the decelerator to the output shaft,
wherein the decelerator comprises:
a ring gear which is connected to the inner wall of the rotor;
a sun gear which is connected to the motor housing and spaced apart from a circumference of the output shaft;
a plurality of planet gears which are disposed between the ring gear and the sun gear, arranged on a circumference of the sun gear, and have one end engaged to the ring gear and another end engaged to the sun gear; and
a carrier which is configured to transfer a rotational speed exerted by revolution of the plurality of planet gears to the output shaft.

2. The in-wheel actuator of claim 1, wherein the decelerator is configured to reduce the rotational speed received from the rotor by two steps, and transfer the reduced rotational speed to the output shaft.

3. The in-wheel actuator of claim 1,
wherein the ring gear, the sun gear, the plurality of planet gears, and the carrier respectively correspond to a first ring gear, a first sun gear, a plurality of first planet gears, and a first carrier,
wherein the decelerator further comprises:
a second sun gear which is arranged on a circumference of the first carrier;
a second ring gear which is connected to the motor housing and spaced apart from a circumference of the second sun gear;
a plurality of second planet gears which are disposed between the second ring gear and the second sun gear, arranged on a circumference of the second sun gear, and have one end engaged to the second ring gear and the other end engaged to the second sun gear; and
a second carrier which is configured to transfer a rotational speed driven by a revolution of the plurality of second planet gears to the output shaft.

4. An in-wheel actuator comprising:
a driving motor which includes a motor housing, a rotor rotatably arranged inside the motor housing, and a stator spaced apart from an outer wall of the rotor and fixed onto an inner wall of the motor housing;
a hollow shaft which is arranged in the motor housing and accommodated by the rotor, and has a hollow with one open end and an outer wall fixed to an inner wall of the rotor so that the hollow shaft rotates by a rotational power of the rotor;
a decelerator which is inserted into the hollow of the hollow shaft and is configured to decrease a rotational speed of the hollow shaft;
a cover which is coupled to the motor housing, and has an inner space and an open end that is toward the hollow shaft and is aligned in parallel to the open end of the hollow shaft in a manner that the open end of the cover and the open end of the hollow shaft overlap each other, and thereby accommodates the decelerator as well as the hollow shaft; and
an output shaft which is configured to receive the rotational speed decreased by the decelerator, wherein the decelerator is configured to reduce the rotational speed received from the rotor by one step, and output a rotational speed reduced by the decelerator to the output shaft, wherein the decelerator comprises:

a ring gear which is connected to the inner wall of the rotor and receives a rotation of the rotor to rotate;

a sun gear which is connected to the motor housing and spaced apart from a circumference of the output shaft;

a plurality of planet gears which are arranged on a circumference of the sun gear and disposed between the ring gear and the sun gear; and a carrier which is coupled to the output shaft.

5. The in-wheel actuator of claim 4, wherein the ring gear is fixed to an inner wall of the hollow shaft to connect to the rotor.

6. The in-wheel actuator of claim 4, wherein the sun gear is fixed to the motor housing such that the sun gear does not rotate with the ring gear.

7. The in-wheel actuator of claim 4, wherein one side of each of the plurality of planet gears is engaged to the ring gear and another side of each of the plurality of planet gears is engaged to the sun gear.

8. The in-wheel actuator of claim 4, wherein the carrier is configured to transfer the rotational speed exerted by revolution of the plurality of planet gears to the output shaft.

\* \* \* \* \*